United States Patent [19]

Blatt

[11] 4,022,113
[45] May 10, 1977

[54] FLOW CONTROL VALVE

[76] Inventor: Leland F. Blatt, 31915 Groesbeck Highway, Fraser, Mich. 48026

[22] Filed: Dec. 10, 1975

[21] Appl. No.: 639,395

[52] U.S. Cl. .................................. 91/443; 91/463; 138/45; 138/46

[51] Int. Cl.[2] .................. F15B 13/042; F15D 1/00

[58] Field of Search ............ 91/443, 463, 447, 468; 137/513.5, 543.15; 92/143; 138/45, 46

[56] References Cited

UNITED STATES PATENTS

| 291,818 | 1/1884 | Tudor | 137/543.15 |
|---|---|---|---|
| 917,125 | 4/1909 | Pierce | 137/543.15 X |
| 1,417,291 | 5/1922 | Allen | 251/291 X |
| 1,541,216 | 6/1925 | Hendricks | 251/291 X |
| 1,871,958 | 8/1932 | Chryst | 137/513.5 X |
| 2,541,464 | 2/1951 | Davies | 91/468 X |
| 2,974,637 | 3/1961 | Holmes et al. | 91/447 X |
| 3,106,226 | 10/1963 | Machen | 138/45 |
| 3,255,963 | 6/1966 | Gorchev et al. | 138/46 X |
| 3,438,308 | 4/1969 | Nutter | 91/447 X |
| 3,448,765 | 6/1969 | McKinney | 137/513.5 |
| 3,877,489 | 4/1975 | Louie et al. | 138/46 |
| 3,920,042 | 11/1975 | Blatt | 137/513.5 |

Primary Examiner—Irwin C. Cohen
Attorney, Agent, or Firm—Cullen, Settle, Sloman & Cantor

[57] ABSTRACT

A flow control valve comprises a body having a longitudinal bore therethrough at one end terminating in a first port and intermediate its ends a second port which communicates with said bore and is adapted for a connection to a cylinder port. The body has an apertured valve seat intermediate said ports and communicating with said first port. A valve element is adapted for registry with and for adjustment away from said seat. An apertured cap is threaded into the other end of the body and receives a manually adjustable valve control pin threaded thereinto and nested and sealed within said cap for relative longitudinal movements therein. A valve pin retainingly engages the valve element and at one end is secured to the valve control pin. A spring is interposed in compression between said valve element and valve control pin normally biasing said valve element towards said seat. The valve control pin is selectively adjustable within said end cap for variably spacing said valve element from said valve seat and thus variably restricting return flow of pressure fluid from said second port to said first port, in turn, controlling the speed of movement of a piston and rod within said cylinder.

3 Claims, 6 Drawing Figures

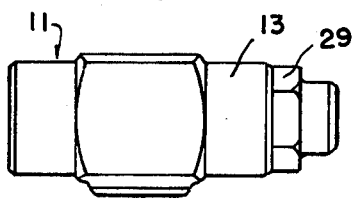
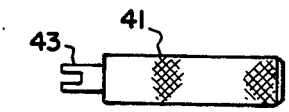
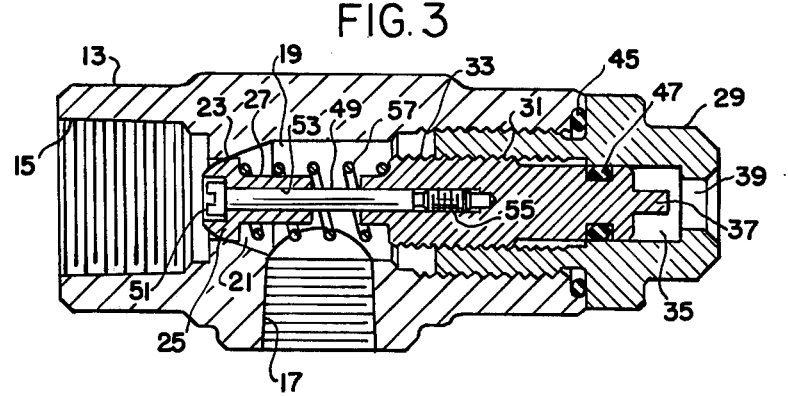

FLOW CONTROL VALVE

BACKGROUND OF THE INVENTION

This application represents an improvement in my, U.S. Pat. 3,920,042 dated Nov. 18, 1975.

BRIEF DESCRIPTION OF THE INVENTION

It is an object of the present invention to provide an improved flow control valve adapted for mounting upon the cylinder port of a single acting cylinder or upon both cylinder ports of a double acting cylinder for controlling reciprocal movements of the piston and piston rod projecting therefrom.

It is another object to provide a flow control valve which permits unrestricted flow of pressure fluid into a cylinder port for pressurizing a piston within said cylinder for movement in one direction, and which is adapted to variably restrict the return flow of said pressure fluid through the flow control valve in the reverse direction upon movement of said piston in the opposite direction.

It is another object to provide an improved flow control valve which includes a manually adjustable valve control pin upon the interior of the flow control valve and enclosed therby whereby on adjustments of said pin the valve element may be variably adjusted away from the valve seat for selectively and variably restricting the flow of return fluid from the cylinder port outwardly of the cylinder.

It is a further object to provide an adjustment for said flow control valve which is guarded and completely enclosed within the valve body and which requires an application of a special tool for adjusting said valve conrol pin.

These and other objects will be seen from the following specification and Claims in conjunction with the appended drawing:

THE DRAWING

FIG. 1 is a full scale side elevational view of the present flow control valve;

FIG. 2 is an actual size side elevational view of the hand tool for adjusting the valve control pin therein;

FIG. 3 is a longitudinal section of the flow control valve of FIG. 1 on an increased scale;

FIG. 4 is a left end elevational view thereof;

FIG. 5 is a right end elevational view thereof;

FIG. 6 is a schematic diagram illustrating the use and mounting of a pair of flow control valves upon the cylinder ports of a double acting cylinder and showing the fluid connections thereto.

It will be understood that the above drawing illustrates merely a preferred embodiment of the invention, and that other embodiments are contemplated within the scope of the Claims hereafter set forth.

DETAILED DESCRIPTION OF THE INVENTION

Referring to the drawing the flow control valve generally indicated at 11, FIG. 1, actual size, is shown on an increased scale and longitudinal section in FIG. 3. Said valve includes an elongated body 13 having a longitudinal bore 19 therethrough.

An internally threaded first port 15 is arranged at one end of the body and in communication with bore 19.

a second internally threaded port 17 is arranged intermediate the ends of said body and in communication with bore 19 and is adapted for mounting over the cylinder port 63 and 65 of cylinder 59 shown schematically in FIG. 6.

Within said body there is a throated bore 21 communicating with bore 19 and with first port 15 to define a valve seat 23 for the ball type of valve element 25 having an elongated shank 27.

End cap 29 is threaded into the other end of said body and includes an internal threaded bore 31 which receives the enclosed valve control pin 33.

The bore 31 of said cap terminates in the outer bore 35 which protectively and guardably encloses the adjusting flange 37 upon the outer end of said valve control pin. Access to said flange is through the counterbore 39 in the outer end of cap 29.

Valve adjusting tool 41 shown in actual size, FIG. 2, has a formation 43 at one end of reduced dimension and predetermined shape adapted for manual projections into counterbore 39 and bore 35 for cooperative operative registry with flange 37. This provides a means by which the valve control pin may be manually adjusted lengthwise of the end cap by the use of a special tool. This provides against unauthorized or accidental readjustments of said valve control pin once it has been set.

Annular seal 45 is nested within one end of the body and in cooperative registry with end cap 29. An additional annular pin seal 47 nested within an annular groove of the valve control pin and in cooperative registry with bore 35 of the end cap.

Elongated ball pin 49 includes a head 51 at one end which retainingly engages valve element 25 and extends loosely through said valve element and its shank and is threaded into and secured within valve control pin as at 55 for rotary movements therewith and adapted for longitudinal movements therewith for variably unseating the valve element 25 relative to seat 23.

A coiled compression spring 57 or equivalent spring means surrounds the valve pin 49 and is interposed in compression between said valve element and the valve control pin 33 normally biasing the valve element towards seat 23. While in the illustration, the valve element is shown seated, in normal operation and upon a predetermined longitudinal adjustment of the valve control pin 33, said valve will be unseated variably for determining the extent of return flow of pressure fluid such as compressed air or a liquid into first port 15 for exhausting.

While the flow control valve shown in FIG. 3 may be adapted for a single action type of cylinder having a single fluid intake or exhaust port, the present flow control valve is particularly adapted for use in conjuction with a double acting cylinder such as the cylinder 59 shown schematically in FIG. 6 and which includes a conventional piston and attached reciprocal piston rod 61 projecting therefrom. A pair of cylinder parts 63 and 65 are connected to opposite end portions of said cylinder for selectively delivering pressure fluid to opposite ends thereof for effecting reciprocal movements of said piston rod.

In the preferred embodiment of the invention, the pressure fluid referred to is compressed air though it is contemplated that other pressure fluids could be employed including liquids such as oil. In the illustration shown in FIG. 6, a flow control valve is mounted upon each of the cylinder ports 63 and 65.

A conventional four-way valve 67 is schematically shown having a conduit 69 adapted for connection to a source of pressure fluid such as compressed air, and having an exhaust conduit X. Said four-way valve has a pair of conventional conduits 71 and 73 which respectively connect the first ports 15 of the two flow control valves for selectively pressurizing opposite ends of the cylinder under the control of the four-way valve.

The 90° relationship between port No. 1 and 15 and port No. 2 at 17 allows the flow control valves to be assembled with respect to the control flow side, i.e., the second port 17 applied to the respective cylinder ports 63 and 65. This gives a very low silhouette. The control flow adjustment is accomplished by the small special wrench 41 shown in FIG. 2 which is designed to fit into any particular configuration of the flange 37 on the valve control pin 33. This provides a tamper-proof adjustable setting for the flow control valve.

With the flow control valve assembled over the cylinder ports 63 and 65 of the double acting air cylinder 59, the control port 17 in each case or vertical port receives the respective cylinder ports. Alternately pressurized conduits 71 and 73 are connected at all times to the corresponding horizontally disposed free-flow ports 15 of the respective flow control valves.

For cylinder actuation, and depending upon the positioning of the valve element within the four-way valve 67, air pressure is directed, for example, through conduit 73 to first port 15. The pressure against the surface area of the control ball or valve element 24 forces it to slidably move on the valve pin 49 and is stopped on the shoulder of the valve control pin 33. In this position, the maximum or free-flow of fluid will enter the cylinder from conduit 73 causing the piston rod 61 to move to the right of FIG. 6. The piston within the cylinder forces the air under pressure out of the cylinder port 63 and into the second port 17 of the other flow control valve. Since the valve 25 has been adjusted by the valve control pin 33 to an unseated position relative to the seat, variably, as desired and preselected, the position of the valve element will determine the volumertric flow of exhaust fluid, namely the compressed air allowed to escape at any particular preset position of the valve element with respect to the valve seat 23. This controls the speed that the air cylinder will operate in two directions.

On a reversal of the valve element within four-way valve 67, in order to exhaust pressure fluid through the conduit 73, compressed air is delivered through conduit 71 to the second flow control valve and its first port 15. The valve element 23 unseats against the action of the spring 57 for a reasonably free flow for fluid; namely, the compressed air into the opposite end of said cylinder through cylinder port 63.

As above described, air under pressure from the opposite side of the piston is then controllably exhausted through cylinder port 65 and through the second port 17 and around the unseated valve element 25 through conduit 73 to the four-way valve for exhausting to atmosphere or otherwise.

By the present arrangement of the flow control valves upon opposite ends of the double acting cylinder, the speed in two directions of its piston rod may be regulated. The speed can be equal, depending upon the setting of the respective valve control pins 33 or may be regulated depending upon the variable unseating of the corresponding valve elements to different speeds as desired.

The same mode of operation would apply in the event you have an single acting cylinder where only one end of the cylinder is pressurized and, thus, employing one flow control valve. The introduction of pressure fluid to the cylinder in one direction would thus be unrestricted whereas, upon release of pressure and the return of the piston rod to its initial position such as under a spring means, the return movement would be controlled, depending upon the variably unseating adjustment of the valve element with respect to the valve seat 23.

Having described my invention, reference should now be had to the following Claims.

I claim:

1. In combination, a double acting cylinder assembly including a reciprocal piston and a piston rod projecting from said cylinder, and a pair of cylinder ports adapted to respectively receive and exhaust pressure fluid for controlling reciprocal movements of said piston rod;

a flow restrictor mounted upon each cylinder port, each flow restrictor comprising a body having a longitudinal bore therethrough, at one end terminating in a first port, and intermediate its ends a second port receiving and connected to a cylinder port;

said body having an apertured seat in said bore intermediate said ports and communicating with said first port;

an annular restrictor element in said bore adapted for spaced registry with and adjustment away from said seat;

an apertured end cap with an enclosed chamber threaded into the other end of the body and sealed therein;

a manually adjustable control pin including manual adjustment means rotatably threaded into and nested and sealed within said chamber of said cap for relative longitudinal movements therein with the manual adjustment means being confined within said enclosed chamber;

a headed pin retainingly engaging and extending through said restrictor element and at one end secured to said control pin;

and spring means between said restrictor element and control pin biasing said restrictor element towards said seat;

said control pin being selectively rotatable within said end cap for variably spacing said restrictor element from said seat; and for variably restricting return flow of pressure fluid from said second port to said first port, controlling the speed of movement of said piston and rod within said cylinder; whereby variably delivering pressure fluid to the first port of one restrictor, there is an unrestricted flow of said pressure fluid through said second port into one end of the cylinder, the exhaust from the other end of said cylinder passing through the other cylinder port and into the second port of the other flow restrictor for restricting flow around the restrictor element and through the seat of said second flow restrictor, the second port extending at right angles to the body for mounting upon the corresponding cylinder port, with the respective end caps arranged outwardly and in alignment to facilitate access to said control pins for adjustment thereof.

2. A flow restrictor comprising a body having a longitudinal bore threaded at one end of the body, a first port at the other end of the body adapted for connection to a pressure fluid conduit, and a second port intermediate the ends of the body and commuciating with said bore and adapted for connection to a cylinder port;

said bore adjacent its other end terminating in a throated bore in said body defining an apertured seat communicating with said first port;

an annular restrictor element within said throated bore adapted to be in spaced registry with said seat and for adjustment away from said seat;

an end cap having an axial bore and a chamber therein and having an internally threaded shank threaded into said one end of said body;

an externally threaded manually adjustable control pin threaded into said end cap and enclosed thereby for relative longitudinal movements therein;

a headed pin retainingly engaging and extending loosely through said restrictor element and at one end secured to said control pin;

said restrictor element abutting the pin head;

spring means interposed between said restrictor element and control pin biasing said restrictor element towards said seat;

said control pin being selectively preset in said end cap holding said restrictor element spaced from said seat, whereby return flow of pressure fluid from said second port to said first port is restricted, said restrictor element adapted to move in one direction against said spring means on application of pressure fluid to said first port;

annular sealing means interposed between said end cap and body and end cap and control pin;

a key of predetermined shape projecting from one end of said control pin and enclosed within said end cap;

and an adjusting tool having an extension adapted for projection into said cap and of a shape to operatively receive said key for rotatively adjusting said control pin.

3. A flow restrictor comprising a body having a longitudinal bore therethrough, threaded at one end and at its other end terminating in a first port, and intermediate its ends a second port communicating with said bore, and adapted for connection to one port of a cylinder;

said body having an apertured seat in said bore intermediate said ports communicating with said first port;

an annular restrictor element in said bore adapted for spaced registry with and for adjustment away from said seat;

an internally and externally threaded apertured end cap with an enclosed chamber threaded into said one end of said body;

a threaded manually adjustable control pin including manual adjustment means rotatively threaded into and nested within said cap for relative longitudinal movements therein with the manual adjustment means being confined within said enclosed chamber;

a headed pin retainingly engaging and extending through said restrictor element and at one end secured to said control pin;

said restrictor element abutting the pin head;

said restrictor element having an apertured shank slidably and guidably mounted on said pin;

spring means between said restrictor element and control pin biasing said restrictor element towards said seat;

said control pin being selectively adjustable within said end cap for variably spacing said restrictor element from said seat, for variably restricting return flow of pressure fluid selectively from said second port to said first port, adapted for controlling the speed of movement of a piston and rod within a cylinder;

and annular sealing means interposed between said end cap and body and end cap and control pin, there being a free flow of pressure fluid through said first port in one direction retracting said restrictor element relative to said seat;

flow in the opposite direction being restricted, rotation of said control pin relative to said cap effecting longitudinal adjustments of said pin for variably adjusting said restrictor element relative to said seat to control return flow of pressure fluid through said first port.

* * * * *